April 18, 1939.   A. T. SCOTT   2,155,367
ACID TREATING OF BENZOL
Filed Oct. 26, 1937
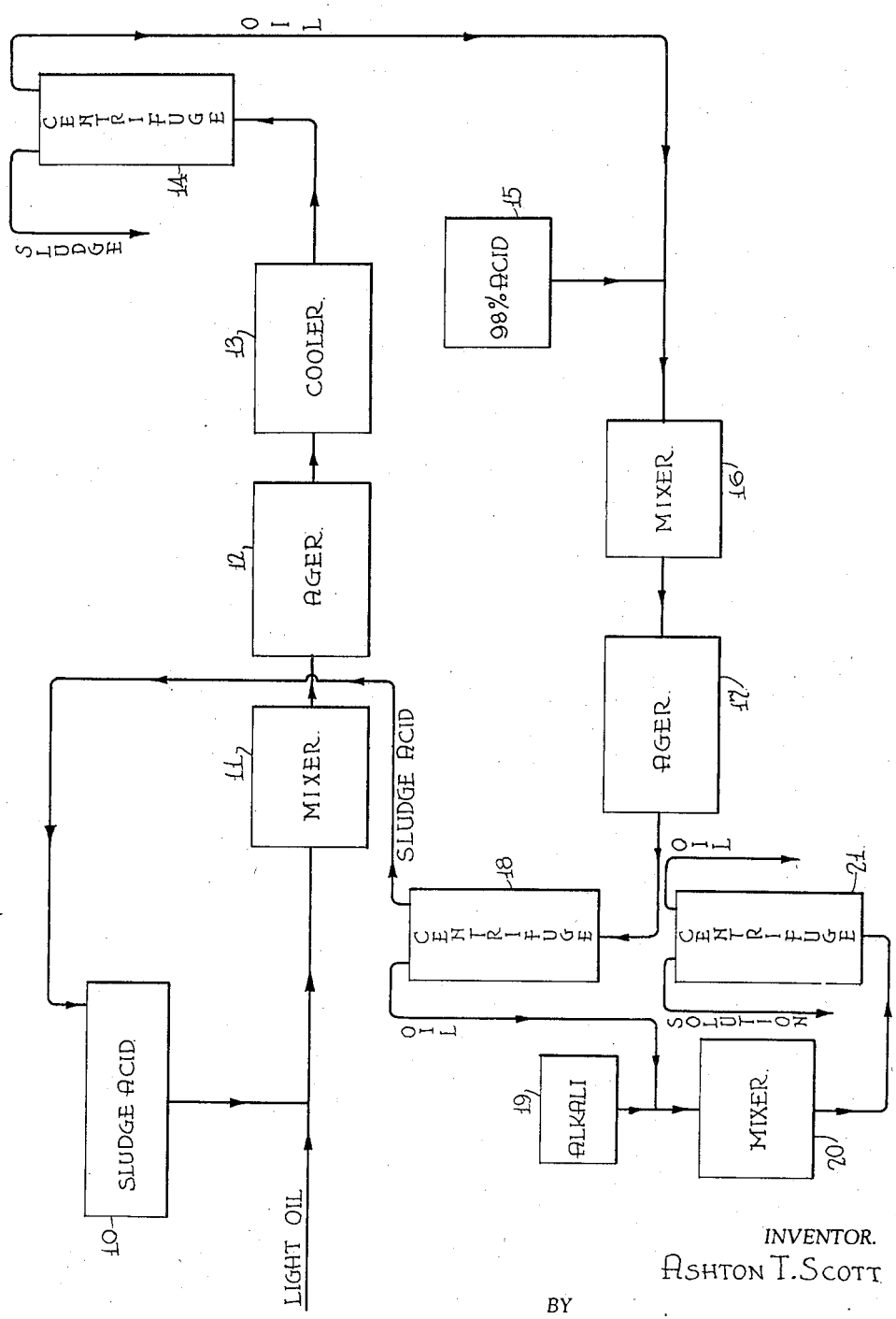
INVENTOR.
Ashton T. Scott
BY Maurice A. Crews
ATTORNEY.

Patented Apr. 18, 1939

2,155,367

UNITED STATES PATENT OFFICE 2,155,367

ACID TREATING OF BENZOL

Ashton T. Scott, Ardmore, Pa., assignor to The Sharples Corporation, a corporation of Delaware Application October 26, 1937, Serial No. 171,091

6 Claims. (Cl. 196—40)

The present invention pertains to the purification of materials of the general character of the benzol and light oil fractions derived from coal tar and similar products. These products will hereinafter be referred to as light oils. It has been customary to treat oils of this character with sulphuric acid, in order to remove from the oil constituents which have undesirable effects on its stability, odor and color. The object of the present invention has been to improve upon the results obtained by such acid treatment. More specifically it has been the object of the invention to provide a process affording a higher yield of oil, a more thorough separation of impurities from the oil and a more thorough separation of reaction products from the oil than could be attained by prior art processes. The manner in which these results are attained in the practice of the invention will be evident from a reading of the following description in the light of the attached flow sheet, in which, The single figure is a diagrammatic representation of the process of the invention.

Referring to the drawing by reference characters, the entire process is preferably performed during the continuous flow of oil and reagents, as illustrated. In the illustrated embodiment of the invention, the oil to be purified is passed into confluence with sludge acid from container 10, this acid being obtained from a subsequent acid treating step of the process as described hereinafter. The temperature during the reaction reaches a point between 140 and 165° F. In order that this temperature may be maintained during the course of the reaction, the oil is preferably heated to a temperature between 110 and 130° F. prior to treatment with the sludge acid. The mixture of oil and sludge acid passes to the mixer 11, where it is intensely mechanically agitated for a brief period (usually between one-half and two minutes) during the continuous flow of the material. The agitator of the mixer 11 disperses the acid in the oil in very fine droplets, thereby causing thorough contact between the oil and sludge reagent and reaction of the sludge with the impurities to be removed. By the employment of relatively high temperatures and intense agitation, the sludge acid is caused to react rapidly with the undesired impurities, and the temperature rises rapidly during this reaction to a point between 140 and 165° F. (preferably about 155° F.). The chemical reaction between the sludge acid and impurities is practically completed within the mixer 11, as indicated by the fact that the materials undergo practically no further temperature increase after leaving that mixer.

After leaving the mixing step 11, the mixture is passed through an ager 12, which is provided with a mechanical agitator operated at a low speed to gently churn the mixture of materials under treatment for a period varying between 2 and 10 minutes.

From the ager 12, the mixture is passed through a cooler 13, which may be any desired form of continuous refrigerating apparatus designed to lower the temperature to a point below 120° F.

From the cooler 13, the mixture is passed to a continuous centrifugal separator 14, where it is separated into sour oil and sludge respectively. The oil from the centrifugal separator, like oil from prior art processes of treating light oils, is contaminated with a small amount of sludge, and it is a primary object of the following steps of the process to remove that sludge. To this end, the oil is treated with concentrated sulphuric acid from container 15, and intimately mixed with that acid in the mixer 16, the construction and operation of the mixer 16 being similar to that described above with respect to mixer 11. From the mixer 16, the mixture passes to an ager 17 which is similar in construction, and operated similarly to, ager 12.

While the structure and details of operation of mixer 16 and ager 17 are similar to those of mixer 11 and ager 12, the effect of the operations performed in the mixer 16 and ager 17 is very different from that in the mixer 11 and ager 12. The operation performed in the mixer 11 causes a vigorous and rapid reaction between the sludge acid and the impurities to be removed, while the function of the mixer 16 and ager 17 is to cause solution or physical combination of sludge remaining in the oil discharged from centrifuge 14 with acid from container 15 and thus to enable the residual sludge to be separated in the centrifuge 18, together with the acid added at 15. This difference in function is indicated by the fact that the temperature of the oil increases by approximately 35° F. (e. g., from 120° F. to 155° F.) during passage through the mixer 11, whereas there is practically no increase in temperature as the oil passes through the mixer 16.

In the practice of the invention, attempt is made to obtain complete reaction between the impurities to be removed from the oil, and the acid, in the mixer 11 and ager 12, and it is for this reason that the oil is heated prior to the mixing operation which is performed in the mixer 11.

Having obtained substantially complete reaction of the sludge acid with the impurities, and removal of most of the resulting impurities together with the sludge acid by passage through the centrifuge 14, the function of the step of adding fresh concentrated acid is principally one of extracting the small traces of residual impurities from the oil by solution in, or association with, this concentrated acid. In this step of treating the oil with fresh concentrated acid to remove residual impurities, reaction between the oil and this fresh acid is undesired, and the oil is therefore cooled at a stage of the process prior to the stage at which concentrated acid is passed into confluence with the oil, this cooling step serving to prevent further chemical reaction between the oil and acid and to bring the oil to a temperature at which the maximum effect of solution or association with the fresh acid is attained.

The mixture from the ager 17 is passed through a continuous separator 18, where it is separated into sludge acid and purified oil. The sludge acid from the centrifuge 18 is passed to container 10 and used in the subsequent practice of the process in the performance of the initial steps of the process in the treatment of further oil. The oil from the centrifuge 18 is treated with alkali from container 19 in order to neutralize this oil, the mixture of oil and alkali being intensely agitated in the mixer 20. The material from the mixer 20 passes to a continuous centrifugal separator 21, where it is resolved into purified oil and an aqueous solution of the reaction product of the alkali with the acid content of the oil.

Modifications will be obvious to those skilled in the art. Thus, the fundamental feature of the invention consists in the performance of the step of initially mixing sludge acid with oil at a relatively high temperature to cause substantially complete reaction of the acid with the impurities in this initial treating step, and in the lowering of the temperature of the oil after separation of the resulting acid sludge from the oil in order that the subsequent treatment with fresh acid may be performed at a lower temperature best adapted to facilitate removal of residual impurities from the oil without loss of oil by reaction which might occur if the subsequent treatment with concentrated acid were performed at higher temperatures.

It will be understood that, while a succession of two countercurrent treating steps is disclosed, a larger number of countercurrent steps may be employed in the practice of the process of the invention. It will also be understood that the invention is not limited to the use of the particular types of mixers and agers described above, but that other types of apparatus designed to perform the functions of these elements may be substituted in the practice of the process.

Still further modifications will be obvious to those skilled in the art and I do not therefore wish to be limited except by the scope of the sub-joined claims.

I claim:

1. In the acid treatment of light oils, the steps comprising contacting the oil to be treated with acid sludge derived from the treatment of light oil with concentrated sulphuric acid, thoroughly mixing the sludge acid and oil to cause reaction of the sludge acid with the oil while maintaining the oil at a temperature in excess of 130° F. and thereby effecting reaction of the sludge acid with substantially all of the impurities which have undesirable effects on its stability, odor and color, thereafter separating from the oil acid sludge resulting from said reaction, and then mixing with fresh concentrated sulphuric acid the oil so separated from the bulk of the sludge in order to dissolve residual sludge in said fresh acid, and thereafter separating from the purified oil, sludge formed by said last-mentioned acid treatment.

2. In the acid treatment of light oils, the steps comprising contacting the oil to be treated with acid sludge derived from the treatment of light oil with concentrated sulphuric acid, thoroughly mixing the sludge acid and oil to cause reaction of the sludge acid with the oil while maintaining the oil at a temperature in excess of 130° F. and thereby effecting reaction of the sludge acid with substantially all of the impurities which have undesirable effects on its stability, odor and color, thereafter separating from the oil acid sludge resulting from said reaction, and then mixing at a temperature below 120° F. with fresh concentrated sulphuric acid the oil so separated from the bulk of the sludge in order to dissolve residual sludge in said fresh acid, and thereafter separating from the purified oil, sludge formed by said last-mentioned acid theatment.

3. In the acid treatment of light oils, the steps comprising contacting the oil to be treated with acid sludge derived from the treatment of light oil with concentrated sulphuric acid, thoroughly mixing the sludge acid and oil to cause reaction of the sludge acid with the oil while maintaining the oil at a temperature in excess of 130° F. and thereby effecting reaction of the sludge acid with substantially all of the impurities which have undesirable effects on its stability, odor and color, thereafter separating from the oil acid sludge resulting from said reaction, and then mixing with fresh concentrated sulphuric acid the oil so separated from the bulk of the sludge in order to dissolve residual sludge in said fresh acid, thereafter separating from the purified oil, sludge formed by said last-mentioned acid treatment, and using sludge separated from the oil after said last-mentioned acid treatment in the treatment of further light oil.

4. In the acid treatment of light oils, the steps comprising contacting the oil to be treated with acid sludge derived from the treatment of light oil with concentrated sulphuric acid, thoroughly mixing the sludge acid and oil to cause reaction of the sludge acid with the oil while maintaining the oil at a temperature in excess of 130° F. and thereby effecting reaction of the sludge acid with substantially all of the impurities which have undesirable effects on its stability, odor and color, thereafter separating from the oil acid sludge resulting from said reaction, and then mixing at a temperature below 120° F. with fresh concentrated sulphuric acid the oil so separated from the bulk of the sludge in order to dissolve residual sludge in said fresh acid, thereafter separating from the purified oil, sludge formed by said last-mentioned acid treatment, and using sludge separated from the oil after said last-mentioned acid treatment in the treatment of further light oil.

5. In the acid treatment of light oils, the steps comprising contacting the oil to be treated with acid sludge derived from the treatment of light oil with concentrated sulphuric acid, thoroughly mixing the sludge acid and oil to cause reaction of the sludge acid with the oil while maintaining the oil at a temperature in excess of 130° F. and thereby effecting reaction of the sludge acid with substantially all of the impurities which have undesirable effects on its stability, odor and color, thereafter separating from the oil acid sludge resulting from said reaction, and then mixing with fresh concentrated sulphuric acid the oil so separated from the bulk of the sludge in order to dissolve residual sludge in said fresh acid, and thereafter centrifuging from the purified oil, sludge formed by said last-mentioned acid treatment.

6. In the acid treatment of light oils, the steps comprising contacting the oil to be treated with acid sludge derived from the treatment of light oil with concentrated sulphuric acid, thoroughly mixing the sludge acid and oil to cause reaction of the sludge acid with the oil while maintaining the oil at a temperature in excess of 130° F. and thereby effecting reaction of the sludge acid with substantially all of the impurities which have undesirable effects on its stability, odor and color, thereafter centrifuging from the oil acid sludge resulting from said reaction, and then mixing with fresh concentrated sulphuric acid the oil so separated from the bulk of the sludge in order to dissolve residual sludge in said fresh acid, and thereafter centrifuging from the purified oil, sludge formed by said last-mentioned acid treatment.

ASHTON T. SCOTT.